United States Patent [19]

Appius

[11] 3,709,311
[45] Jan. 9, 1973

[54] TOP-LOADING BALANCE

[75] Inventor: Max K. Appius, Berneck, Switzerland

[73] Assignee: Mettler Instrumente AG, Griefensee-Zurich, Switzerland

[22] Filed: May 28, 1971

[21] Appl. No.: 147,803

[30] Foreign Application Priority Data

June 1, 1970 Switzerland..........................8185/70

[52] U.S. Cl..............177/203, 177/216, 177/DIG. 9
[51] Int. Cl. .............................................G01g 1/34
[58] Field of Search..........177/203, 216, 255, DIG. 9

[56] References Cited

UNITED STATES PATENTS

| 2,939,694 | 6/1960 | Bradley | 177/DIG. 9 |
|---|---|---|---|
| 392,617 | 11/1888 | Lieb et al | 177/DIG. 9 |
| 3,148,742 | 9/1964 | Giulie | 177/DIG. 9 |

Primary Examiner—George H. Miller, Jr.
Attorney—Kelman and Berman

[57] ABSTRACT

The parallelogram linkage of a top-loading balance which maintains the positions of the weighing pan parallel during pivoting movement of the balance beam includes the beam, a portion of the stationary support structure, and two guide members, which are connected by band hinges. The major dimensions of each band in the two hinges on the ends of the guide member parallel to the balance beam are located in one of two intersecting planes in a certain angular position of the guide member and the connected other linkage member. Only the major dimensions of one band are located in one of the planes, thereby reducing the torsional stiffness of the parallelogram linkage and minimizing the effect of the linkage on the weight response of the balance.

7 Claims, 5 Drawing Figures

PATENTED JAN 9 1973 3,709,311

INVENTOR.
MAX K. APPIUS
BY Kelman and Berman
AGENTS

TOP-LOADING BALANCE

This invention relates to top-loading balances, and particularly to an improved guide system for holding the loading face of the weighing pan in such a balance in positions parallel to each other during movement of the balance beam.

It has been proposed heretofore to employ elastic ribbon bearings in balances in which the weighing pan is suspended from the beam by means of a hanger. An elastic ribbon bearing may be used as the main bearing connecting the beam to the normally stationary support structure of the balance, and another elastic ribbon bearing may connect the hanger of the weighing pan to the beam. Each bearing includes two flexible ribbons or bands of spring-temper metal whose terminal portions are fixedly fastened to the connected balance elements in such a manner that the ribbons intersect each other. The bearing axis is located in the line of intersection of the two planes defined by the ribbons in a certain angular position of the two connected elements.

The ribbon bearings of the type described above have advantages over bearings employing a knife edge and a plate in that they are not subject to wear. Yet, they were not employed heretofore in the guide system of a top-loading balance which maintains the horizontal position of the weighing pan, and more particularly of its upwardly directed loading face. A parallelogram linkage is the basic feature of the guide system, and it is practically impossible to maintain precise parallel alignment of the pivot axes in the four corners of the parallelogram when the linkage members are connected by hinges corresponding to the known elastic ribbon bearings. Contrary to knife edge bearings, ribbon bearings cannot be adjusted after installation. Even slight misalignment of the hinge axes would affect the response of the balance to an applied load, particularly the change in the angular position of the balance beam under increasing load.

The primary object of the invention is the provision of an improved hinge arrangement for a parallelogram linkage of the type described in which the linkage and its elements do not affect the response of the balance beam to an applied load. It is another object to provide a guide system for the weighing pan of a balance which prevents erroneous readings when the weighing pan is not centrally loaded.

According to the invention, these objects are achieved by the use of flexible band hinges on a guide member of the parallelogram linkage which is parallel to the balance beam. As is known in itself, the major dimensions, that is, length and width, of each band are located in one of two intersecting planes in a certain angular position of the parallel guide member and a connected member, but the major dimensions of only one band are located in one of the planes. The torsional stiffness of the hinge is greatly reduced by such an arrangement, and misalignment of the hinge axes in the parallelogram linkage is automatically compensated.

Other features, additional objects, and many of the attendant advantages of this invention will readily be appreciated as the invention becomes better understood by reference to the following detailed description of a preferred embodiment when considered in connection with the appended drawing in which:

FIGS. 2 to 5 illustrate the balance of FIG. 1 in respective fragmentare sections on the lines II—II, III—III, IV—IV, and V—V.

Figure 1:
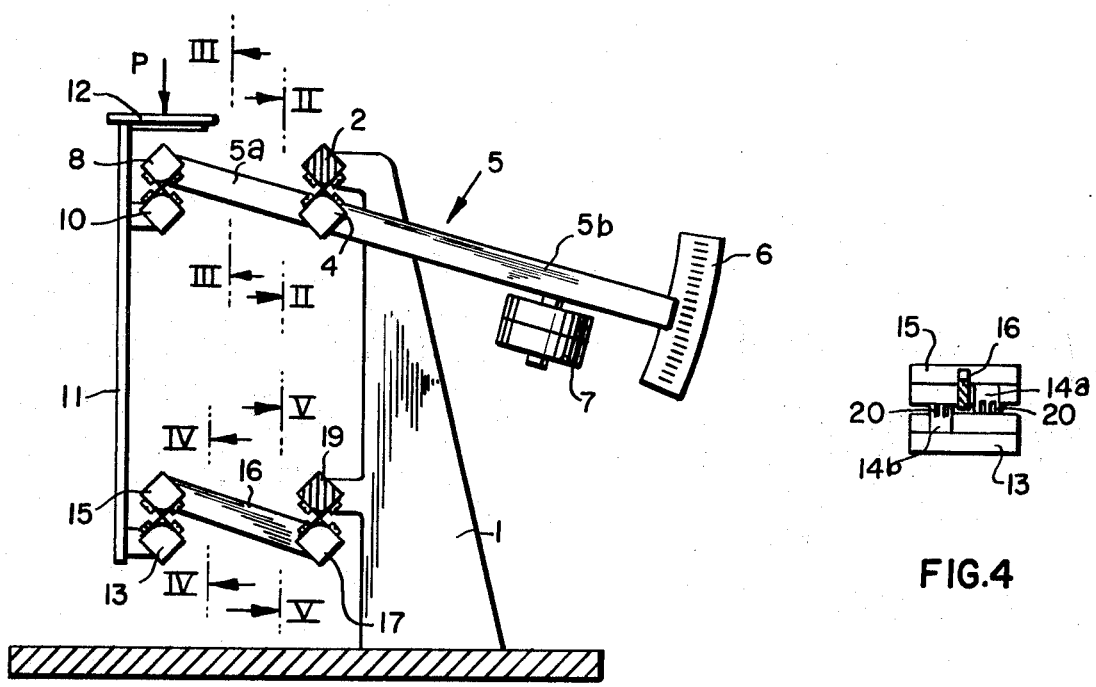
FIG. 1 shows a top-loading balance of the invention in side-elevational section on the line I—I in FIG. 2.

The normally stationary supporting structure of the illustrated balance consists of two columns 1 integrally cast with a common base plate and upright in the illustrated operative position of the balance. The top ends of the columns 1 are fixedly connected by a cross bar 2 of square cross section, and another cross bar 19 vertically aligned with the bar 2 connects the columns 1 near their common base plate. The diagonal planes of the bars 2, 19 are vertical and horizontal, and all other cross bars referred to hereinbelow are of square cross section and similarly oriented when in the illustrated position.

A movable cross bar 4 is suspended from the parallel cross bar 2 by means of a flexible band hinge essentially consisting of two pairs 3a, 3b of thin, spring-temper metal bands. In the illustrated position of the apparatus, the major dimensions, that is, the length and width of each band are located in two planes intersecting each other in a horizontal line parallel to the elongations of the bars 2, 4. The bar 4 may pivot on the bar 2 about an axis coinciding with the line of intersection.

The beam 5 of the balance is received in a notch of the cross bar 4 and fixedly fastened to the bar 4 so that the afore-described band hinge constitutes the main bearing of the balance. The longer arm 5b of the beam 5 carries a plate 6 whose vertical face is provided with an arcuate row of indicia centered in the axis of the band hinge 3a, 3b. The optical system employed for projecting the indicia on a ground glass carrying a reference line has been omitted since it may be entirely conventional. The longer arm 5b of the beam 5 also carries a counterpoise 7.

The shorter arm 5a of the beam 5 which extends obliquely upward from the main bearing is fixedly fastened to a horizontal cross bar 8, and another horizontal cross bar 10 is attached to the bar 8 by pairs 9a, 9b of flexible metal bands in a hinge arrangement virtually identical with that forming the main bearing of the balance. A flat guide bar 11 is fixedly attached to the cross bar 10 and projects upwardly beyond the hingedly connected cross bars 8, 10 and the beam 5. Its upper end carries a fixedly fastened weighing pan 12 having a top face which is horizontal when the balance base is similarly oriented. The load to be weighed acts on the top face of the pan 12 as indicated by an arrow P.

The lower end of the guide bar 11 carries a horizontal cross bar 13 connected by two spring-metal bands 14a, 14b with a cross bar 15 on one end of another guide bar 16. The other end of the bar 16 is hingedly secured to the afore-mentioned cross bar 19 by a much shorter cross bar 17 fixed on the bar 16 and by three metal bands 18a, 18b', and 18b".

As is best seen in FIG. 4, the bars 13, 15 are connected by only two metal bands 14a, 14b which are located on either side of the guide bar 16, and whose effective width in the direction of the hinge axis is reduced by slots 20 elongated in a direction from the terminal portion of each band 14a, 14b fastened to the cross bar 13 toward the terminal portion fastened to the cross bar 15. The short screws which hold the bands 14a, 14b to the associated cross bars have been omitted from FIG. 4 for the sake of clarity, and corresponding screws have been omitted from FIGS. 2, 3, and 5. When the hinge of FIG. 4 is viewed in FIG. 1, it is seen that the width and length of only the one band 14a extends in the plane which is perpendicular to the plane defined by the width and length of the band 14b. The minimum number of resilient bands together with the slots 20 reduces the torsional stiffness of the hinged connection between the guide bars 11, 16 sufficiently to compensate for misalignment in the parallelogram linkage constituted by the guide bars 11, 16 for the pan 12, the shorter arm 5a of the beam 5, and the part of the support structure 1 between the bars 2 and 19.

The hinge connection between the bars 17, 19 is only slightly stiffer in torsion than that described with reference to FIG. 4. As is evident from joint consideration of FIGS. 1 and 5, the length and width of only a single band 18a are located in the plane extending from the upper right to the lower left in FIG. 1, and the two bands 18b' and 18b'' which are located in the other plane and are symmetrical relative to the band 18a in the view of FIG. 5 have a combined width in the direction of the hinge axis which is not greater than the corresponding dimension of the band 18a. The hinge arrangement of FIG. 5 thus also has limited torsional stiffness in the plane of FIG. 5.

Figures 2, 5:
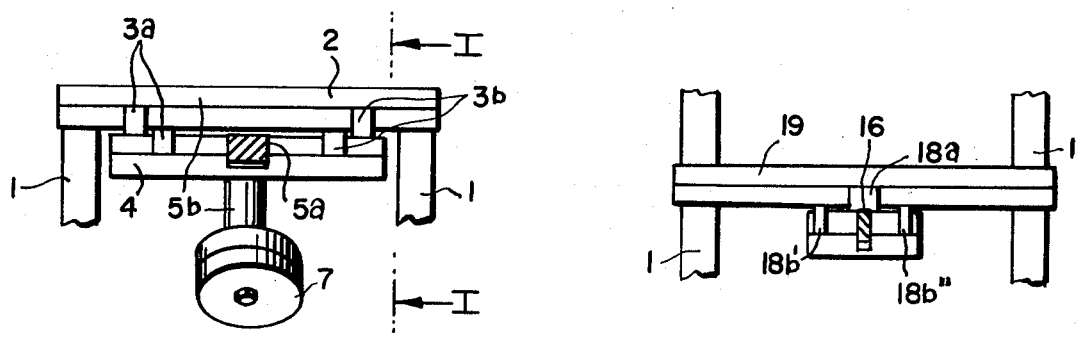
Figure 3:
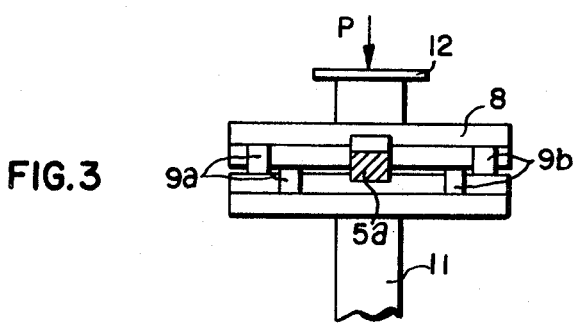

Because of their low torsional stiffness in the vertical planes of FIGS. 4 and 5, the two hinge arrangements on the guide bar 16 do not affect the response of the beam 5 to a load P applied to the weighing pan 12 in any angular operative position of the beam, and the four hinge axes are aligned automatically. The hinges at the ends of the guide bar 16 have relatively high flexural stiffness in respective horizontal planes through their pivot axes, and thereby prevent incorrect readings on the beam 5 when an applied load is not centered on the loading face of the pan 12. The parallelogram guiding system constituted by the guide bars 11, 16, the beam 5, and the support 1 is virtually free from lost motion.

While it is preferred to employ elastic band hinges at all four corners of the parallelogram, many of the advantages of the invention are retained if the hinges connecting the balance beam 5 to other members of the parallelogram linkage are of a different type, for example, of the knife edge and plate type.

It should be understood, therefore that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:

1. A balance comprising, in combination:
   a. a normally stationary support;
   b. a beam;
   c. pivot means securing said beam to said support for pivoting movement about a pivot axis,
      1. said beam having two arms extending from said pivot means in opposite directions;
   d. first and second guide members;
   e. first, second, and third hinge means having respective first, second, and third hinge axes at least approximately parallel to said pivot axis,
      1. said first hinge means hingedly securing said first guide member to said support,
      2. said second hinge means hingedly securing said second guide member to said first guide member, and
      3. said third hinge means hingedly securing said second guide member to one of said arms in a position in which said one arm, said support, and said guide members jointly constitute a parallelogram linkage,
      4. said support and said second guide member being upright in all normal operating positions of said balance;
   f. a weighing pan mounted on said second guide member,
      1. said pan having a loading face located above said beam and upwardly directed in said operating positions;
   g. a counterpoise on the other arm of said beam; and
   h. indicia means on said parallelogram linkage for indicating the angular position of said beam relative to said pivot axis,
      1. the respective torsional stiffnesses of said pivot means transverse to said pivot axis and of said third hinge means transverse to said third hinge axis being substantially greater than the respective torsional stiffnesses of said first and second hinge means transverse to said first and second hinge axes.

2. A balance as set forth in claim 1, wherein said indicia means are mounted on said beam.

3. A balance as set forth in claim 2, wherein said first and second hinge means each include a plurality of flexible band members securing said first guide member to other members of said linkage, each band member having two terminal portions fastened to said guide member and to an associated other member of said linkage respectively, and having two major dimensions of length and width substantially greater than the thickness of said band member, in a predetermined angular position of said guide member and said associated other member, the major dimensions of each band member extending in one of two planes intersecting each other, the major dimensions of not more than one band member extending in one of said planes.

4. A balance as set forth in claim 3, the major dimensions of at least two of said band members in said first hinge means extending in the other plane in said predetermined angular position.

5. A balance as set forth in claim 3, one of the band members of said second hinge means being formed with slots elongated in a direction from one of said terminal portions to the other terminal portion, said slots being of a number and of a size sufficient to significantly decrease the torsional stiffness of said second hinge means.

6. A balance as set forth in claim 3, said third hinge means and said pivot means each including a plurality of flexible band members, the band members of said third hinge means having each two terminal portions fastened to said beam and to said second guide member respectively and having two major dimensions of length and width, said major dimensions of each band member of the third hinge means extending in one of two planes intersecting each other substantially in the hinge axis of said third hinge means, the band members of said pivot means having each two terminal portions fastened to said beam and to said support respectively and having two major dimensions of length and width, said major dimensions of each band member of said pivot means extending in one of two planes intersecting each other substantially in said pivot axis.

7. A balance as set forth in claim 6, the major dimensions of two flexible band members of said third hinge means extending in each of the two planes intersecting each other substantially in the hinge axis of said third hinge means, and the major dimensions of two flexible band members of said pivot means extending in each of the two planes intersecting each other substantially in said pivot axis.

* * * * *